United States Patent
Polverari et al.

(10) Patent No.: US 8,697,790 B2
(45) Date of Patent: Apr. 15, 2014

(54) POLYMERIC COMPOSITIONS AND THEIR PRODUCTION AND USES

(75) Inventors: Marco Polverari, Montreal (CA); Anneli Lepo, Tampere (FI); Michael O'Toole, Marietta, GA (US)

(73) Assignee: Kemira Oyj, Helsinki (FI)

( * ) Notice: Subject to any disclaimer, the term of this patent is extended or adjusted under 35 U.S.C. 154(b) by 0 days.

(21) Appl. No.: 13/569,516

(22) Filed: Aug. 8, 2012

(65) Prior Publication Data
US 2013/0037230 A1 Feb. 14, 2013

(30) Foreign Application Priority Data

Aug. 10, 2011 (FI) .................................. 20115792

(51) Int. Cl.
*C08J 3/02* (2006.01)
*C08J 3/03* (2006.01)
*C08J 3/05* (2006.01)
*D21H 17/33* (2006.01)

(52) U.S. Cl.
USPC ........... 524/284; 524/457; 524/500; 524/501; 524/502; 162/164.6

(58) Field of Classification Search
USPC ........ 524/284, 457, 500, 501, 502; 162/164.6
See application file for complete search history.

(56) References Cited

U.S. PATENT DOCUMENTS

| | | | |
|---|---|---|---|
| 2,834,675 A | 5/1958 | Jen et al. | |
| 3,686,109 A | 8/1972 | Aldrich et al. | |
| 5,045,212 A * | 9/1991 | Augustin et al. | 210/708 |
| 6,001,920 A | 12/1999 | Ghafoor et al. | |
| 2010/0256244 A1* | 10/2010 | Rey et al. | 516/135 |

FOREIGN PATENT DOCUMENTS

WO 98/31748 7/1998

OTHER PUBLICATIONS

International Search Report, dated Oct. 4, 2012, from corresponding PCT application.
FI search report dated Jun. 1, 2012 in corresponding FI 20115792.
Suen, T.J. et al., "Polycondensation of Alkylene Dichlorides with Alkylene Polyamines", Journal of Polymer Science, vol. 45, 1960, pp. 289-303.

* cited by examiner

*Primary Examiner* — Michael Pepitone
(74) *Attorney, Agent, or Firm* — Young & Thompson

(57) ABSTRACT

A composition includes a dispersion, having an aqueous phase containing a dissolved water soluble cationic coagulant polymer and if needed a dissolved inorganic salt. The aqueous phase further contains a dispersed water soluble flocculant polymer, wherein the water soluble flocculant polymer is formed of a water soluble ethylenically unsaturated monomer or monomer blend which are polymerized in the aqueous phase. The water soluble cationic coagulant polymer is cationic poly(alkyleneamine), which is the reaction product of the following reaction:

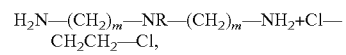

wherein R is selected from the group consisting alkyl radicals containing from 1 to 4 carbon atoms m is an integer of from 1 to 4. The amount of dissolved inorganic salt is less than 10% by weight of the composition, and the composition is in a stable, pourable, dispersion form.

12 Claims, 1 Drawing Sheet

POLYMERIC COMPOSITIONS AND THEIR PRODUCTION AND USES

FIELD OF THE INVENTION

The present invention is in the field of paper manufacturing. The invention relates to polymeric compositions comprising water-soluble polymer dispersion and their production and uses. The polymer dispersion of the invention can be used in the pretreatment of paper stuff by adding the same to paper stuff before papermaking to thereby improve drainage, retention and dewatering at pressing.

BACKGROUND OF THE INVENTION

It is well known that the clarification or dewatering of sewage and industrial sludges and similar organic suspensions may be aided with the use of chemical reagents, added in order to induce a state of coagulation or flocculation which facilitates the process of solid/liquid or liquid/liquid separation from water. For this purpose, lime or salts of iron or aluminum have been utilized. More recently synthetic polyelectrolytes, particularly certain cationic copolymers of acrylamide, have been found to be of interest.

Cationically charged water soluble or water dispersible polymers are utilized in a variety of processes that involve the separation of solids or immiscible liquids dispersed or suspended in water from water, and the dewatering of solids containing water. These types of polymers, which may be natural or synthetic, are broadly termed coagulants and flocculants. These polymers can be utilized in such diverse processes as emulsion breaking, sludge dewatering, raw water clarification, drainage and retention aids in the manufacture of pulp and paper, flotation aids in mining processing and color removal. Polymers of this type generally work by neutralizing the anionic charge of the suspended solids, or liquids, which are to be removed.

It is known to supply and use water soluble, high cationic charge, low intrinsic viscosity (IV) coagulant polymers. Often they are provided in the form of aqueous solutions. These materials have relatively low IV and low molecular weight, which is sometimes an advantage. However, there are many occasions when it would be desirable if they could additionally perform in a manner that is typically associated with higher molecular weight materials.

Higher molecular weight, water soluble, polymers (generally of lower ionic charge) are frequently used as flocculants. Because of their higher IV and molecular weight, it is usually impracticable to supply them as aqueous solutions containing more than, at the most, 5% or 10% by weight of polymer. Even at 5% concentration the solutions are liable to have too high viscosity, and they may even be a rigid gel at higher concentrations. Accordingly flocculant polymers are generally supplied to the customer as powders or as reverse phase emulsions or dispersions in oil.

When the customer receives a powder, it is generally necessary for the customer to dissolve that powder in water prior to use, and the dissolution process can be slow and inconvenient. When the customer receives an emulsion, it is again generally necessary to dissolve the polymer of the emulsion into water during use and the resultant solution is contaminated with surfactant and the oil or other continuous phase of the emulsion. This is undesirable.

In order to avoid the disadvantages of dissolving powder or dealing with the oil continuous phase, there have been numerous attempts to provide water soluble, relatively high molecular weight, polymer in an aqueous composition, wherein the resultant composition has acceptable viscosity but much higher concentration than would be associated with that high molecular weight polymer if dissolved in water.

U.S. Pat. No. 6,001,920 discloses a pourable, liquid composition containing a blend of at least 8% water soluble high IV cationic polymer and a water soluble low IV cationic coagulant polymer which preferably comprises polyamine, and water soluble inorganic salt. According to the teaching of U.S. Pat. No. 6,001,920 it is necessary to include water soluble inorganic salt in the composition and the amount is normally at least 10% by weight and is usually at least 15% by weight of the composition, but it can be as much as 30% or even 35%. Preferably the concentration of salt is substantially the saturation concentration of that salt in the composition, preferably 90 to 100%, of the saturation concentration.

The preferred polyamines (cationic coagulant polymers) disclosed in U.S. Pat. No. 6,001,920 are copolymers of dimethylamine and epichlorohydrin. It is very typical that, when papermakers speak of "polyamines," they are most often referring to a series of copolymers of dimethylamine and epichlorohydrin. The repeating unit of the linear form of the copolymer is $-CH_2-CHOH-CH_2-N^+(CH_3)_2-$. The presence of a quaternary ammonium group within the backbone of this molecule ensures that it maintains its very strong cationic charge throughout the pH range of most papermaking operations. Molecular masses are typically between tens of thousands and hundreds of thousands of grams per mole.

Another typical polymer used as cationic coagulant polymers is polydiallyldimethylammonium chloride (DADMAC), which is a linear homopolymer formed from a monomer that has a quaternary ammonium and two unsaturated $-CH=CH2$ functionalities. The monomer itself is formed by reacting two equivalents of allyl chloride with dimethylamine. Free-radical polymerization of the "DADMAC" monomers yields a structure in which the quaternary ammonium groups are on rings that are included in the backbone of the polymer chain. This composition means that the poly-DADMAC macromolecules tend to be quite stiff, having a longer persistence length than, for instance, polyamines. For this reason, poly-DADMAC is expected to have a more extended conformation in solution. The molecular weight of DADMAC is typically in the range of hundreds of thousands of grams per mole, and even up to a million for some products.

EP 1522556A1 discloses a water-soluble polymer dispersions with fluidity and solubility properties so as to enable use in papermaking raw material pretreatments added to papermaking raw materials prior to machine operation. In particular, the water-soluble polymer dispersion is one comprising water-soluble polymer fine particles of 100 μm or less diameter having at least one ionic property selected from among cationic, amphoteric, nonionic and anionic properties together with a polyalkyleneimine wherein according to necessity an appropriate amount of water-soluble inorganic salt is incorporated. The polyalkyleneimine used is a preferably a polyethylenimine.

Polyethylene imine (PEI) is formed from monomer, which consists of a three-membered ring. Two corners of the monomer molecule consist of $-CH2-$ linkages. The third corner is a secondary amine group, $=NH$. In the presence of a catalyst this monomer is converted into a highly branched polymer with about 25% primary amine groups, 50% secondary amine groups, and 25% tertiary amine groups. This product is sometimes called "pure polyethyleneimine" in order to differentiate it from certain copolymers of ethyleneimine and acrylamide. The latter mixture is copolymerized to produce so-called "modified PEI," that has a molecular mass up to about 2 million grams per mole.

The use and optimization of highly charged additives to a paper machine is never simple. There is a constant need to find new compositions for improving drainage, retention and formation in the paper making processes.

BRIEF DESCRIPTION OF THE DRAWINGS

In the following the invention will be described in greater detail by means of preferred embodiments. Further, the Examples will refer to the attached drawings, in which.

DESCRIPTION OF THE INVENTION

Figure 1:
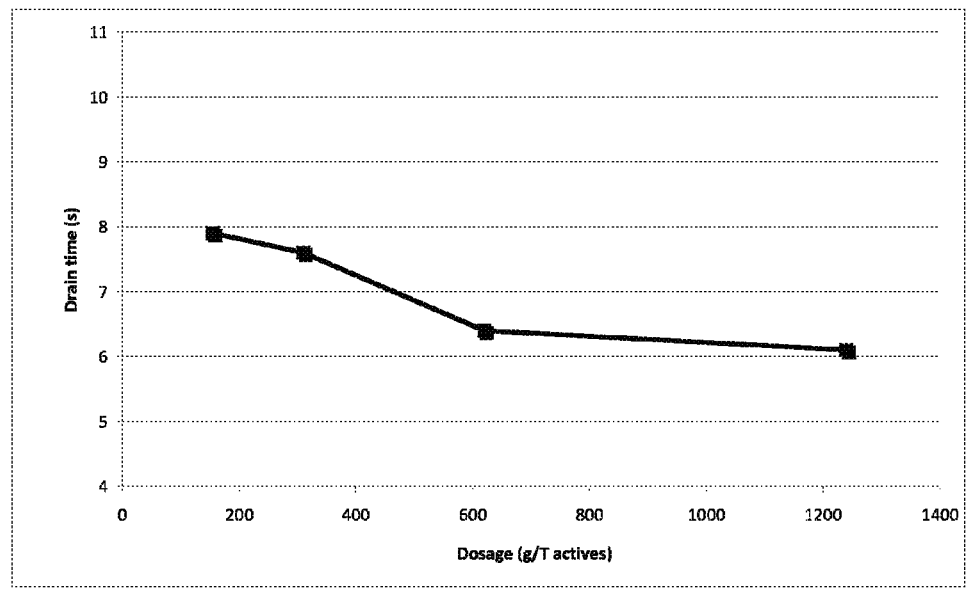
FIG. 1 is a diagram showing the results of drain time [s] as a function of the dosage amount [g/t actives] of the inventive dispersion.

An object of the present invention is thus to provide a new composition comprising a polymer dispersion and having improved drainage, retention and/or dewatering at pressing properties in the paper making processes. The objects of the invention are achieved by the composition, which is characterized by what is stated in the claim 1. The preferred embodiments of the invention are disclosed in other claims.

As a first aspect the present invention provides a composition comprising dispersion, having an aqueous phase containing a dissolved water soluble cationic coagulant polymer and if needed a small amount of dissolved inorganic salt, and the aqueous phase further containing a dispersed water soluble flocculant polymer, wherein the water soluble flocculant polymer is formed of a water soluble ethylenically unsaturated monomer or monomer blend which are polymerized in the aqueous phase, and wherein the water soluble cationic coagulant polymer is cationic poly(alkyleneamine), which is the reaction product of the following reaction (I)

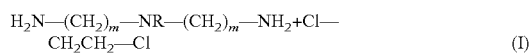
(I)

wherein R is selected from the group consisting alkyl radicals containing from 1 to 4 carbon atoms m is an integer of from 1 to 4,
the amount of dissolved inorganic salt is less than 10% by weight of the composition, and
the composition is in a stable, pourable, dispersion form.

The above described composition may be used to improve drainage, retention and dewatering at pressing. These compositions offer an "online dual system", which is based on the use of two retention agents with different modes of action (coagulant and flocculant polymers). This combination of unites the advantages of these two product groups and produces optimum retention and drainage results. The two components are combined in the inventive composition in such a way that they can be metered like a single component. The metering may be carried out continuously and thus may be adapted to meet the retention and drainage requirements in each paper mill.

As mentioned earlier, U.S. Pat. No. 6,001,920 teaches that it is always necessary to include water soluble inorganic salt in the composition and the amount is normally at least 10% by weight and is usually at least 15% by weight of the composition, but it can be as much as 30% or even 35%. However, the high amount of salt is not always optimal for the total paper making process, and therefore the aim is to find alternative dispersion compositions, which would be stable and pourable (i.e. not gelled or too viscous) without the high amounts of salt.

The salt used in the composition is preferably a salt which has high solubility in water and it can be an ammonium, alkali metal or alkaline earth metal chloride, bromide or iodide, such as ammonium chloride, sodium chloride or magnesium chloride, or it can be a sulphate such as sodium sulphate or ammonium sulphate. Water soluble polyvalent salts, such as polyaluminium chloride, can be used and have the advantage that their presence may then contribute to the performance of the composition since such polyvalent salts often have coagulating properties themselves. Mixtures of salts are often preferred, especially a mixture of ammonium sulphate and sodium chloride.

There is also the need to find water-soluble polymer dispersion compositions wherein the polyDADMAC, polyamine and/or PEI are replaced with poly(alkyleneamine) type polymer. Thus, the aim was to develop a polymer dispersion, where the flocculant polymer is dispersed in a water-coagulant media and the concentration of salt is very low.

The inventors have made some tests using a water-soluble polymer dispersion, wherein the flocculant polymer was copolymer of 90% molar of acrylamide and 10% molar of [2-(acryloyloxy)ethyl]trimethyl ammonium chloride. When the coagulant polymer in the water-soluble polymer dispersion product was a polyalkylene polyamine, which is the reaction product of the following reaction (Ia)

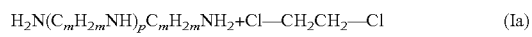
(Ia)

wherein m is an integer of at least 2, and p is an integer of from 1 to 4, the products obtained were extremely viscous and/or their molecular weight very low. Also attempts with poly-DADMAC were not good. Typical problem is that, if the viscosity is acceptable i.e. so low that the product is easily pourable, then also the molecular weight very low, which effects negatively to the drainage, retention and dewatering at pressing properties of the product when used in the paper making process.

The inventors have surprisingly found out that by using a polymer, which is the reaction product of the following reaction (I), as the coagulant polymer, better products could have been obtained. Reaction (I):

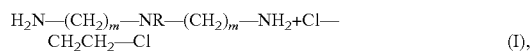
(I), wherein R is selected from the group consisting alkyl radicals containing from 1 to 4 carbon atoms m is an integer of from 1 to 4.

In this case, it is possible to achieve pourable low viscous products at the end of polymerization with higher molecular weight. Additionally, the final conversion is more easily achieved; smaller amount of catalyst was required.

Especially good results are obtained when the water soluble cationic coagulant polymer is cationic poly(alkyleneamine), which is the reaction product of the following reaction (I)

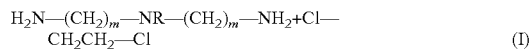
(I)

wherein R is methyl and m is 3. Thus, the especially good results are obtained with a cationic poly(alkyleneamine), which is the reaction product of the following reaction (A):

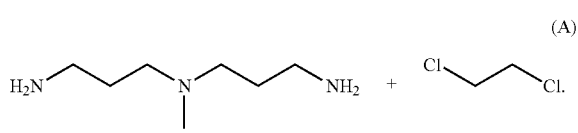

(A)

The preparation of the poly(alkyleneamine), that is used in the present invention as the soluble cationic coagulant polymer, may done by diluting the alkyleneamine with demineralized water and reacting with ethylene dichloride. The reaction is typically carried out at the reflux temperature of the mixture. A possible synthesis method of the poly(alkyleneamine) is disclosed in U.S. Pat. No. 2,834,675.

The soluble cationic coagulant polymer is preferably highly charged i.e. highly cationic. By this is meant that the degree of charged character of these polymers is preferably greater than about 4 meq/g, but it can be greater than about 5 meq/g or even greater than about 6 meq/g measured in pH 7.

The water-soluble polymer dispersion of the present invention may be made by first providing an aqueous solution of poly(alkyleneamine) i.e. solution of cationic coagulant polymer. Then the monomers of the flocculant polymer are added, and water can be added in any step if needed. The final water-soluble polymer dispersion is obtained by radical polymerization that is carried out with stirring in a nitrogen atmosphere by adding a polymerization initiator in one or several steps.

The initiator may be for example a water-soluble azo type polymerization initiator, such as 2,2'-azobis(amidinopropane)dihydrochloride or 2,2'-azobis[2-(5-methyl-2-imidazolin-2-yl)propane]dihydrochloride, or a water-soluble redox system polymerization initiator, such as ammonium persulfate in combination with sodium hydrogensulfite. The polymerization reaction temperature can be appropriately selected within the range of from 0 to 100° C. according to the properties of the polymerization initiator employed. Preferably, that temperature is from 10 to 60° C., more preferably from 20 to 50° C.

The polymerization is generally carried out under neutral to acidic conditions, in which the monomer or monomers are stable, the reactivity is good, and the degree of polymerization and the rate of polymerization are improved. In order to achieve the neutral to acidic conditions for the polymerization, the poly(alkyleneamine) is preferably neutralized by adding acid to the poly(alkyleneamine) solution before the monomers of the flocculant polymer are added to give a weakly alkaline to acidic aqueous solution.

The acid to be used for the neutralization may be an organic acid or an inorganic acid. Among the organic acids, phosphoric acids, formic acid, acetic acid, adipic acid and the like may be used for neutralization and, among the inorganic acids, hydrochloric acid, sulfuric acid, sulfamic acid and the like may be used. The organic acids are preferred, especially orto-phosphoric acid.

Considering the molecular weight, the best results were obtained when the flocculant polymer is formed under polymerization conditions wherein the pH is around 3 to 5 during polymerization, especially at pH around 3.5 to 4.5 or more precisely at pH around 3.8 to 4.2. Lower pH provokes very viscous and unstable products, and higher pH provokes lower molecular weight products.

If necessary, a small amount of an inorganic salt is added, and preferably it is added to and dissolved in the system in an amount to give a concentration within the range from 0.5% by weight to less than 10% by weight based on the total weight of the dispersion. Thus, if an inorganic salt is added, the amount of dissolved inorganic salt in the composition should be relatively low (less than 10%). It can be for example at least 0.5%, at least 1%, at least 2%, or at least 3% by weight, and the upper limit being for example 9%, 8%, 7%, 6% or 5% by weight. Preferably the amount of dissolved inorganic salt is less than 5%, for example between 1-3% by weight of the composition.

In an embodiment of the invention the water-soluble polymer dispersion composition contains 10 to 60%, preferably 15 to 60% by weight of a blend of the water soluble flocculant polymer and the water soluble cationic coagulant polymer.

In the preparation of the final water-soluble polymer dispersion, it is also possible to add some of the cationic coagulant polymer to the reaction mixture after polymerization reaction and therefore the amount the cationic coagulant polymer during the polymerization may different than in the final water-soluble polymer dispersion of the present invention.

The total amount of the water soluble cationic coagulant polymer is typically less than 25%, but it is usually at least 2 or 3% by weight of the total composition during the polymerization reaction. Generally, the amount of the water soluble cationic coagulant polymer during the polymerization is not more than 15% and preferably not more than 10%. It may however be advantageous to add water soluble cationic coagulant polymer to the water-soluble polymer dispersion composition after polymerization so that the in the final polymer dispersion the amount of the water soluble cationic coagulant polymer is less than 40% by weight of the total composition, preferably less than 30% and typically less than 25%.

The amount of the water soluble flocculant polymer is usually above 10% and preferably it is at least 12% and the amount of it is typically less than 30% or less than 35%, but compositions of the invention can contain as much as 40% of the water soluble flocculant polymer or even more. These percentages are by weight of the total composition i.e. of the total water-soluble polymer dispersion of the present invention. Because according to the present invention it is possible to add some of the cationic coagulant polymer to the reaction mixture after polymerization reaction, the percentual amounts of flocculant polymer after the polymerization may be different than after the addition of additional cationic coagulant polymer.

The monomers of which the water soluble flocculant polymer is formed may consist solely of cationic monomer so that the polymer can be a cationic homopolymer or a copolymer made from two or more different cationic monomers. Often, the monomers are a blend of one or more cationic ethylenically unsaturated monomers with one or more other ethylenically unsaturated monomers. Thus the polymer may be formed from 1% to 100% by weight cationic monomer and 0-99% other monomer. Often the blend is formed with acrylamide or other water soluble ethylenically unsaturated nonionic monomer. The polymer may be a cationic amphoteric polymer, in which event ethylenically unsaturated anionic monomer is included in the monomer blend in an amount which is not more than the amount of cationic so as to give a cationic amphoteric polymer. The anionic monomer may be a carboxylic monomer or a sulphonic monomer, e.g., acrylic acid or AMPS.

Preferred polymers contain at least 10% (by weight of the total monomer) of the chosen cationic monomer or monomers, but the amount of these cationic monomers may be 30% or more, or even 50% or more. If acrylamide or other nonionic or anionic monomer is present, the amount is usually at least 0.5% by weight, e.g., 10 to 70%. If anionic monomer is included, the amount of anionic monomer is below 50% and usually 0.5 to 25% by weight, but often it is zero.

The cationic monomer can be a diallyl quaternary monomer, generally diallyl dimethyl ammonium chloride DADMAC, but preferably is a dialkylaminoalkyl (meth)-acrylate or -acrylamide, wherein the alkyl groups generally contain 1 to 4 carbon atoms. Examples are dimethyl or diethyl aminoethyl or propyl(meth)-acrylate or -acrylamide or dimethyl or diethyl aminomethyl(meth)acrylamide. The monomer may be introduced as an acid addition salt or quaternary ammonium salt or the polymer may be converted into such a salt after polymerisation. The quaternising group is usually methyl chloride or other aliphatic quaternising group. Preferably the water soluble flocculant polymer is substantially free of hydrophobic, solubility-reducing, groups such as C4 or higher alkyl (e.g., above C8) or aromatic (such as benzyl) groups on the quaternary nitrogen or elsewhere, since such materials are unnecessary in the invention and reduce the cost performance benefit of the products.

Stability of the composition is critical, because the composition should stay stable for several weeks. The composition of the invention is stable and pourable in the sense that substantially no permanent settling occurs when the composition is allowed to stand for several weeks and the composition has a sufficiently low viscosity that it can be poured. Preferably no sedimentation occurs, but if any sedimentation does occur the sedimented phase is capable of being resuspended by simple stirring. The viscosity of the composition is preferably below 20,000 cps, most preferably below 15,000 cps and often below 10,000 cps. It can be as low as, for instance, 500 or 1,000 cps but is generally above 2,000 cps. All these values are determined by Brookfield RVT, spindle 4, 30 rpm.

In order promote stability and reduce viscosity the aqueous phase of composition according to the invention may further contain an organic acid such as adipic acid or citric acid, polyglycols such as polyethylene glycol, or other multi-hydroxy compound, or combination thereof as an additional stabilizer. The multi-hydroxy compound can be a dihydroxy, trihydroxy or higher hydroxy compound such as glycerol or a polymer such as polyvinyl alcohol. In an embodiment of the invention the amount of the additional stabilizer is at least 1% by weight of the composition.

In another embodiment the polymer dispersion may further comprise at least one low IV cationic coagulant having IV of not more than 2 dl/g, blended therein. The low IV cationic coagulant is water soluble and it has an IV of not more than 2 dl/g as measured using a suspended level viscometer on solutions of the coagulant polymer alone in 1 molar sodium chloride buffered to pH 7.5 at 25 DEG C. It is generally present in an amount of at least 2 or 3%, often at least 5%, by weight of the composition. The low IV cationic coagulant preferably comprises a polyvinylamine or polyamine coagulant polymer; for instance a polymer made by condensation of an amine and/or a diamine or higher amine (e.g., ethylene diamine or tetreethylene pentamine) with epichlorohydrin or other epihalohydrin or with dichloroethane or other dihalo alkane. Usually only one low IV cationic coagulant is used, but if desired blends of it with other low IV cationic coagulants can be used.

Another aspect of the invention is a method of making paper or paperboard, comprising the addition of the inventive composition to the pulp before web formation. In an embodiment of the invention the composition is added in an amount of 0.05-1.5 kg per 1000 kg of pulp, most preferably 0.1-0.5 kg per 1000 kg of pulp. The chemical dosage is on solids basis.

There are several things to consider when selecting an appropriate addition point. The first is the fact that these molecules need only a few minutes to partly absorb into the fine pores at the fiber surface. Such molecules then are unavailable with respect to retention. This could be avoided by adding the cationic material very late to the process. By adding this agent after the shear stages like pumps and screens the retention performance is typically highest. For drainage and press section dewatering purposes also an earlier addition e.g. thin stock before machine screening can be effective. For strength and fixing purposes addition to thick stock is usually the preferred selection.

In an embodiment of the invention the inventive composition is added together with possible other wet-end additives selected from the group comprising cationic or anionic retention agents: such as copolymers of acrylamides, polyvinyl amine and polyethylene imine, silicious and organic microparticles, fillers, optical brightening agents, dyes, sizing agents, cationic starch, fixatives e.g. polyamine or polydadmac, dry strength and wet strength agents.

The suspension which is to be treated can be is preferably a cellulosic suspension, for instance a paper making suspension wherein the composition is used as retention or drainage aid. A further aspect of the invention is a pulp mixture for producing paper or paperboard, which composition comprises the inventive composition. The invention relates also to the use of the inventive composition in the paper making process for improving drainage, retention and/or formation.

EXAMPLES

Example 1

To a 1000 ml reaction flask fitted with a mechanical stirrer, thermocouple, condenser, nitrogen purge tube and addition port is added 292.4 g poly(alkyleneamine) solution (25 w-% active substance) that is a reaction product of N,N-Bis(3-aminopropyl)methylamine and 1,2-dichloroethane and which is neutralized with 25 g orto-phosphoric acid (85 wt-%). Then 222.7 g of ion-exchanged water is added followed by 186.9 g of 50 wt-% acrylamide, 354 g of 80 wt-% acryloyloxyethyltrimethylammonium choride, 0.4 g of ethylenediaminetetraacetic acid, tetrasodium salt, 6.1 g of polyethylenglycol 8000 (PEG 8000), 8.0 g of adipic acid, and finally, 20.7 g of sodium sulfate.

The pH of the mixture of monomers and additives is around 4. The mixture is purged with nitrogen and heated to 40° C. while stirring. After reaching 40° C., 0.125 ml of a 10% solution of 2,2'-Azobis (N,N'-dimethylene isobutyramidine) dihydrochloride (VA-044) is added to the reaction mixture. After 1 hour, polymerization begins and the solution becomes hazy (some dispersion phenomena occur). After 3.5 hours of initiation, 0.370 ml of a 10% solution of VA-044 is added and the reaction is allowed to continue for another 4 hours. After 8 hours of initiation, 0.75 ml of a 10% solution of VA-044 is added and the reaction is allowed to continue for another 4 hours, finally, after 12 hours of initiation, 1.25 ml of a 10% solution of VA-044 is added to the crude of reaction and the reaction is allowed to continue for another 4 hours. After this time, the polymer-in-polymer dispersed product is cooled to room temperature and 188.6 g of poly(alkyleneamine) (25 w-% active substance) that is a reaction product of N,N-Bis (3-aminopropyl)methylamine and 1,2-dichloroethane is added to the crude, provoking a viscosity decrease of the final product. The polymer product has a Brookfield viscosity of 8000 cps (#4 spindle, 30 rpm) and an intrinsic viscosity of 9 dig in 1N NaNO$_3$.

Example 2

Furnish Preparation

Machine chest stock of brown old corrugated containers (OCC) and lean white water were combined at room temperate to ~0.8%. The exact consistency was recorded and polymer was dosed g of active polymer/ton on dry fibre weight.

Drainage Test

Dosages of polymers were delivered via graduated syringe to 500 ml of furnish in the jar of the dynamic drainage analyzer (DDA). The sample was mixed for 5 s at 700 rpm. Drainage was simulated with 300 mbar vacuum for 60 s using mesh 40. The drain time was digitally recorded. The results can be seen in FIG. 1. The drainage time for blank was 9.2 s.

Britt Jar Retention Test

Figure 2:
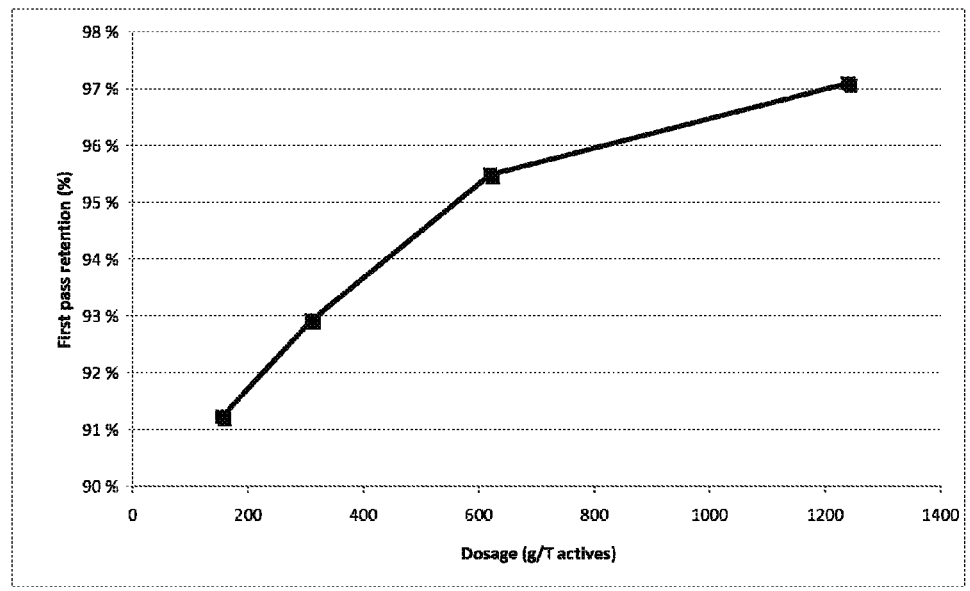
FIG. 2 is a diagram showing the results of first pass retention [%] as a function of the dosage amount of the inventive dispersion.

Dosages were delivered via graduated syringe to 500 ml of furnish in the Britt jar. The sample was mixed for 5 s at 700 rpm before the stop cock was opened and filtrate drained thought a 125 p mesh. Approximately 100 ml of filtrate was collected and solids determined with a whatman 41 ashless filter paper. First pass retention (FPR) is calculated as (stock consistency-filtrate consistency)/stock consistency. The results can be seen in FIG. 2. The FPR for blank was 86%.

Example 3

A Moving Belt Former (from Process Team Finland Oy) was used to measure dewatering as function of the retention. The tests on the MBF were started by adjusting the machine variables and furnish consistency so that the known chemical dosage lead to the desired retention level.

The first pass retention (FPR) was calculated using formula 1.

$$FPR \% = \frac{W(d)}{C*500\ ml}*100\%, \quad (1)$$

where W(d) is the weight [g] of the sheet after drying
C is the consistency [g/ml] of the papermaking furnish As the machine variables were once adjusted they were held constant. Then five sheets (or even more if needed) with slightly varying polymer dosages of each test point were produced. The sheet production was started by placing 500 ml of a papermaking furnish (mechanical pulp and kraft for super calendered (SC) paper grade or old corrugated containers (OCC) for fluting board) in to the mixing jar. The furnish was agitated at a desired speed and the chemical components were added to the furnish at desired moments. After waiting a while the agitation was stopped, the mixing jar lifted and the furnish laid on a plastic film on the forming screen. At the same time belt below the forming screen started to move and the vacuum was activated. Everything happened in less than two seconds and the plastic film was quickly removed to let the drainage and sheet formation begin. The intensity and duration of the vacuum were adjusted to desired levels and held constant during all test points. After the 19 cm×19 cm sheet was formed it was held under a blotting board and a 15 mm thick steel plate for 20 seconds before releasing it from the forming wire. After that it was weighed, pressed under 2 bar pressure for one minute, weighed again, dried in a quick drier and weighed again. Then it was possible to determine the solids content after wire section and after pressing using formulas 3 and 4.

$$Solids\ \%\ (wire) = \frac{(W(d))}{(W(w))}*100\%, \quad (2)$$

where W(d) is the weight [g] of the sheet after drying
W(w) is the weight [g] of the sheet after wire section $$Solids\ \%\ (press) = \frac{(W(d))}{(W(p))}*100\%, \quad (3)$$

where W(d) is the weight [g] of the sheet after drying
W(p) is the weight [g] of the sheet after pressing The five different chemical dosages lead to different retention levels and the chemical dosage needed for the given retention level was determined by drawing a linear trend line that best suited the acquired results. Other results such as the solids content, was then calculated at this given retention level.

SC Wire: DL2874, air permeability: 5100 m$^3$/(m$^2$h)
Agitation: 1500 rpm
T=50° C.
Grammage: 55 g/m$^2$
FPR %: 44.9
Consistency: 0.818%
Avg. Vacuum: 20 kPa

TABLE 1

Super calendered (SC) paper grade

| Chemical system | Solids after press % | Wire solids % | Ash % |
|---|---|---|---|
| Fennopol K4600R (175 g dry polymer/t paper) Dispersion according to the invention (400 g dispersion/t paper) | 49.1 | 15.6 | 47.9 |
| Fennopol K4600R (220 g dry polymer/t paper) Fennosil E-130 (400 g dispersion/t paper) | 49.1 | 15.6 | 48.1 |
| pH | 4.51 | | |
| Conductivity (mS/cm) | 0.99 | | |
| Charge (µEq/l) | −75.24 | | |
| Zetapotential (mV) | −12.10 | | |
| Ash (%) | 61.66 | | |
| Fine particles (<0.250 mm) (%) | 82.80 | | |

The results show that in the SC trial the same "solids after press" and retention was achieved with the dispersion according to the invention as was with a commercial cationic polymer dispersion Fennosil E-130 (Kemira Oyj), but the use of the inventive dispersion lead to a smaller need of the cationic polyacrylamide K4600R (Kemira Oyj).

OCC
Wire: DL2874, air permeability: 5100 m$^3$/(m$^2$h)
Agitation: 2000 rpm
T=50° C.
Grammage: 74 g/m$^2$
FPR %: 62.85%
Consistency: 0.500%
Avg. Vacuum: 24 kPa

TABLE 2

Old corrugated containers (OCC) for fluting board

| Chemical system | Solids after press % | Wire solids % | Ash % |
|---|---|---|---|
| Fennopol K3500R (290 g dry polymer/t paper) | 46.6 | 17.4 | 21.5 |
| Fennopol K4600R (210 g dry polymer/t paper) | 47.3 | 17.6 | 21.6 |
| Dispersion according to the invention (800 g dispersion/t paper) | | | |
| pH | 7.11 | | |
| Conductivity (mS/cm) | 2.26 | | |
| Charge (µEq/l) | −269.00 | | |
| Zetapotential (mV) | −6.70 | | |
| Ash (%) | 27.45 | | |
| Fine particles (<0.250 mm) (%) | 59.30 | | |

In the OCC trial higher "solids after press" was achieved when the dispersion according the invention was used. At the same time the amount of cationic polyacrylamide K3500R (Kemira Oyj) could be reduced.

The invention claimed is:

1. A composition comprising, as a dispersion:
an aqueous phase containing a dissolved water soluble cationic coagulant polymer and if needed a dissolved inorganic salt, and a dispersed water soluble flocculant polymer, wherein,
the water soluble flocculant polymer is formed of a water soluble ethylenically unsaturated monomer or monomer blend which are polymerized in the aqueous phase,
the water soluble cationic coagulant polymer is cationic poly(alkyleneamine), which is the reaction product of the following reaction (I)

$$H_2N-(CH_2)_m-NR-(CH_2)_m-NH_2+Cl-CH_2CH_2-Cl \quad (I)$$

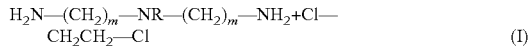

wherein R is selected from the group consisting of alkyl radicals containing from 1 to 4 carbon atoms m is an integer of from 1 to 4,
the amount of dissolved inorganic salt is less that 10% by weight of the composition,
the composition is in a stable, pourable, dispersion form, and
the composition contains 10 to 60% by weight of a blend of the water soluble flocculant polymer and the water soluble cationic coagulant polymer.

2. The composition according to claim 1, wherein the water soluble cationic coagulant polymer is cationic poly(alkyleneamine), which is the reaction product of the following reaction (A):

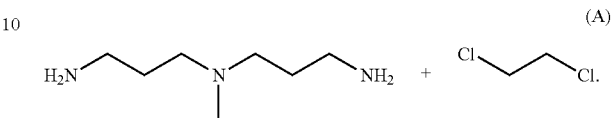

3. The composition according to claim 1, wherein the amount of the water soluble cationic coagulant polymer is from 2 to 40% by weight of the composition.

4. The composition according to claim 1, wherein the dispersion further comprises at least one low IV cationic coagulant having IV of not more than 2 dl/g, blended therein.

5. The composition according to claim 1, wherein the amount of the water soluble flocculant polymer is from 10 to 40% by weight of the composition.

6. The composition according to claim 1, wherein the water soluble flocculant polymer is formed under polymerization conditions wherein the pH is kept between 3 and 5.

7. The composition according to claim 1, wherein the amount of dissolved inorganic salt is at least 0.5% by weight, but less than 10% by weight of the composition.

8. The composition according to claim 1, wherein the aqueous phase further contains citric acid, polyglycol or combination thereof as an additional stabilizer.

9. The composition according to claim 8, wherein the amount of the additional stabilizer is at least 1% by weight of the composition.

10. The composition according to claim 6, wherein the pH is kept between 3.5 and 4.5.

11. The composition according to claim 7, wherein the amount of dissolved inorganic salt is at least 0.5% by weight, but less than 5% by weight of the composition.

12. The composition according to claim 7, wherein the amount of dissolved inorganic salt is between 1-3% by weight of the composition.

* * * * *